Dec. 4, 1945.   R. M. MILLER   2,390,447
CULTIVATOR PLOW
Filed Aug. 12, 1944
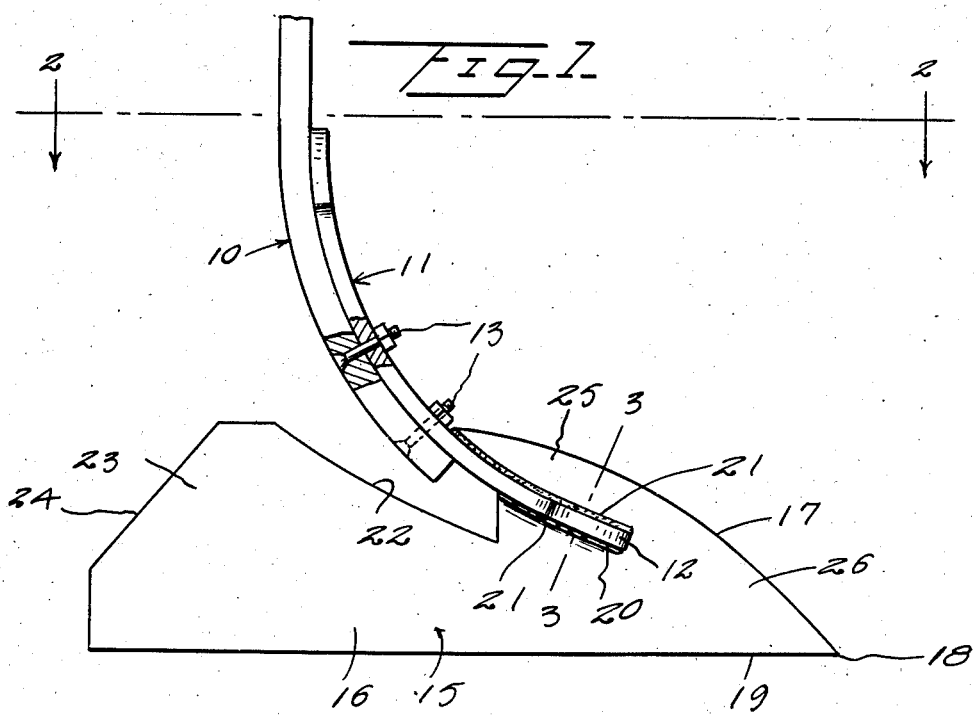
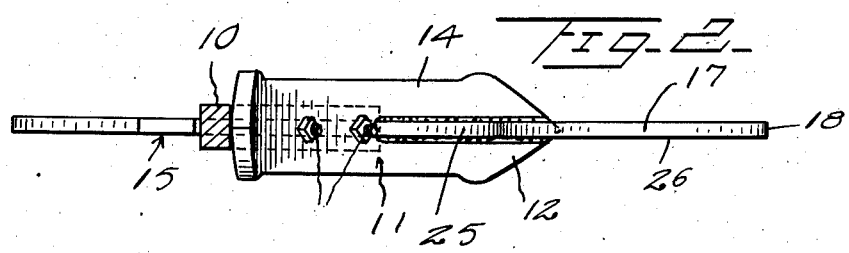
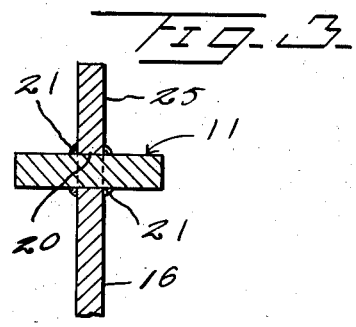
Inventor
R. M. Miller
By Kimmel & Crowell
Attorneys Patented Dec. 4, 1945

2,390,447

UNITED STATES PATENT OFFICE 2,390,447

CULTIVATOR PLOW

Raymond M. Miller, Estacada, Oreg.

Application August 12, 1944, Serial No. 549,191

2 Claims. (Cl. 97—206)

This invention relates to cultivators and more particularly to an improved cultivator plow.

An object of this invention is to provide an improved plow for a cultivator which will not only loosen the ground, but will hold the dirt against covering of the plants.

Another object of this invention is to provide in an earth working plow, a combined guide and shield which will extend into the ground below the plow so as to guide the plow in a straight path, a portion of the device extending above and forwardly of the plow so as to divide the loosened dirt and to break up the dirt ahead of the plow.

A further object of this invention is to provide an attachment for a plow which may be welded or otherwise secured to the plow, and which will provide for the guiding of the plow in a straight line, the breaking of the dirt clods, and dividing the loosened dirt so that the plants will not be covered thereby.

A further object of this invention is to provide a fin or rudder welded to the cultivator plow which extends below the plow depth and holds the plow against sidewise movement in sod or on hillsides. In addition the plow prevents kicking of gangs of plows out of the ground when the plows strike hard objects. The fin or rudder is so constructed that it will not collect trash or weeds.

To the foregoing objects and others which may hereinafter appear, the invention consists of the novel construction, combination and arrangements of parts as will be more specifically referred to and illustrated in the accompanying drawing, but it is to be understood that changes, variations and modifications may be resorted to which fall within the scope of the invention as claimed.

In the drawing:

Figure 1 is a detail side elevation partly broken away and in sections of a cultivator plow constructed according to an embodiment of this invention.

Figure 2 is a sectional view taken on the line 2—2 of Figure 1.

Figure 3 is a sectional view taken on the line 3—3 of Figure 1.

Referring to the drawing, the numeral 10 designates generally the supporting shank of a cultivator plow generally designated as 11. The plow 11 is formed with a point 12 and a shank or body 14 which is secured to the supporting shank 10 by means of bolts or fastening members 13.

In order to provide a means whereby the plow 11 will be guided straight as it is moved forwardly, and so that the loosened dirt will be divided to the opposite sides of the plow, in addition to the dirt being initially loosened ahead of the plow, I have provided a wing or blade generally designated as 15, which is secured to the plow 11. The blade 15 comprises a flat upright body 16 which is formed with an upwardly and rearwardly curved forward edge 17, forming a point 18 at the junction with the lower straight and horizontal edge 19. The body 16 of the blade is formed with a slot 20 extending from the rear end of the curved portion 17 and within which the plow 11 is adapted to engage, being firmly secured in the slot 20 by welding 21. The upper portion of the body 16 is also formed with a cut-out 22 within which the lower portion of the shank 10 is adapted to extend. The rear or trailing portion 23 of body 16 is formed with a downwardly and rearwardly inclined edge 24. The body 16 forms a dirt dividing blade 25, which is positioned on the upper side of the plow 11 for providing for the movement of the dirt loosened by the plow to the opposite sides in an even manner.

In the use of this cultivator plow the shank 10 is secured to a suitable frame, and there may be as many of these plows as may be desired which may be secured in side by side relation. As the plow is moved forwardly, or to the right as viewed in Figure 1, the projecting forward end 26 of the body 16 will break up any dirt clods, and as the point 12 digs into the dirt the dirt will be raised, a portion of the dirt passing off of the plow 11 from one side and the remaining portion passing off of the plow 11 from the opposite side. This dividing of the loosened dirt is caused by the fin 25 projecting above the upper side of the plow 11.

What I claim is:

1. A cultivator plow comprising a plow formed of a forwardly and downwardly inclined point, and a combined guiding, dirt dividing and dirt loosening blade secured to said point, said blade including a vertically disposed flat body having a horizontal lower edge, said body being formed with an elongated slot in the upper portion thereof extending downwardly and forwardly within which said point is positioned, and means securing said point in said slot, said body including a divider extending lengthwise of and upwardly from said point to thereby effect even division of the loosened dirt on opposite sides of said plow member and also including a substantial body portion extending below said point, said body also having a cut-out in the upper edge thereof within which the supporting shank for said point is adapted to loosely extend.

2. A cultivator plow comprising a plow member formed with a forwardly and downwardly inclined V-shaped point, and a combined guiding, dirt dividing and dirt loosening blade secured to said plow member coplanar with the longitudinal axis of the latter, said blade having a downwardly and forwardly inclined slot in the upper edge thereof within which said point is positioned, means securing said point in said slot, said blade having a portion thereof rising from the upper side of said plow member whereby to divide the dirt evenly on opposite sides of the latter, said blade including a substantial portion thereof depending below said plow member to provide a guiding means and a dirt loosening means for said plow member.

RAYMOND M. MILLER.